United States Patent [19]

Lew

[11] Patent Number: 4,499,781

[45] Date of Patent: Feb. 19, 1985

[54] CHAMFERED ROLLER MECHANICAL TRANSMISSION

[76] Inventor: Hyok S. Lew, 7890 Oak St., Arvada, Colo. 80005

[21] Appl. No.: 384,049

[22] Filed: Jun. 1, 1982

[51] Int. Cl.³ ........................ F16H 15/16; F16H 15/56
[52] U.S. Cl. ........................................ 74/193; 74/191; 74/796
[58] Field of Search ................. 74/193, 192, 191, 190, 74/214, 796, 798

[56] References Cited

U.S. PATENT DOCUMENTS

| | | | |
|---|---|---|---|
| 765,956 | 7/1904 | Bucknam | 74/192 |
| 1,207,216 | 12/1916 | Roberts | 74/193 |
| 1,232,243 | 7/1917 | Dick | 74/193 |
| 1,318,588 | 10/1919 | Preston | 74/193 |
| 1,468,401 | 9/1923 | Roberts | 74/193 |
| 1,489,521 | 4/1924 | Conrad | 74/193 |
| 1,844,239 | 2/1932 | Boehme et al. | 74/193 |
| 1,844,703 | 2/1932 | Thompson | 74/193 |
| 3,115,044 | 12/1963 | Andrews | 74/200 |
| 4,183,253 | 1/1980 | Borello | 74/193 |

FOREIGN PATENT DOCUMENTS

| | | | |
|---|---|---|---|
| 921613 | 3/1963 | United Kingdom | 74/191 |
| 149987 | 3/1961 | U.S.S.R. | 74/193 |
| 306301 | 6/1971 | U.S.S.R. | 74/193 |

*Primary Examiner*—George H. Krizmanich
*Assistant Examiner*—Michael David Bednarek

[57] ABSTRACT

This invention relates to a friction-drive type mechanical transmission of continuously variable transmission ratios in a range comprising a plurality of the operational transmission ratios separated by a plurality of the transitional transmission ratios. The mechanical transmissions of the present invention comprises a pair of the conical rotating members connected to a pair of the power shaft couplings, respectively, which pair of the conical rotating members are coaxially disposed providing a void space therebetween comprising a series of the cylindrical shell voids of progressively varying diameters interconnected by a series of the frustum shell voids. A plurality of the chamfered rollers of the geometry of a cylinder with two chamfered ends rotatable about their own axis are disposed within said void space between two conical rotating members on a plane perpendicular to the central axis of said two conical rotating members wherein the rotational motion of said two rotating conical members are coupled to one another by the chamfered rollers under pressed frictional contact with said two conical rotating members, which pressured frictional contact is provided by the surface of the cylindrical midsection of the chamfered rollers in contact with the outer and inner surfaces of the cylindrical shell voids or by the surfaces of two chamfered ends of the chamfered rollers respectively in contact with the outer and inner surfaces of the frustum shell voids intermediate two adjacent cylindrical shell voids. The transmission ratio is varied by shifting the chamfered rollers in the direction parallel to the central axis of said two conical rotating members.

9 Claims, 5 Drawing Figures

1

CHAMFERED ROLLER MECHANICAL TRANSMISSION

SUMMARY OF THE INVENTION

This invention relates to a friction-drive type mechanical transmission of continuously variable transmission ratios in a range comprising a plurality of the operational transmission ratios separated by a plurality of the transitional transmission ratios. The mechanical transmissions of the present invention comprises a pair of the conical rotating members connected to a pair of the power shaft couplings, respectively, which pair of the conical rotating members are coaxially disposed providing a void space therebetween comprising a series of the cylindrical shell voids of progressively varying diameters interconnected by a series of the frustum shell voids. A plurality of the chamfered rollers of the geometry of a cylinder with two chamfered ends rotatable about their own axis are disposed within said void space between two conical rotating members on a plane perpendicular to the central axis of said two conical rotating members wherein the rotational motion of said two rotating conical members are coupled to one another by the chamfered rollers under pressed frictional contact with said two conical rotating members, which pressured frictional contact is provided by the surface of the cylindrical midsection of the chamfered rollers in contact with the outer and inner surfaces of the cylindrical shell voids or by the surfaces of two chamfered ends of the chamfered rollers respectively in contact with the outer and inner surface of the frustum shell voids intermediate two adjacent cylindrical shell voids. The trans-mission ratio is varied by shifting the chamfered rollers in the direction parallel to the central axis of said two conical rotating members.

BACKGROUND OF THE INVENTION

The present day continuously variable speed mechanical transmission of the friction-drive type employs the friction balls under point contact with the friction drive surface or the tapered friction rollers under line contact with the friction drive surface wherein a continuous slip between the mating friction drive surface exists over the entire length of the line of contact with the exception of single point. For said reason, the majority of the present day continuously variable speed mechanical transmissions of the friction-drive type are limitted to the low torque and low power mechanical transmission applications in the industry.

The primary object of the present invention is to provide the continuously variable speed mechanical transmissions of the friction-drive type wherein the contact between the friction drive surfaces is the line contact with zero slip over the entire length of the line of contact.

Another object of the present invention is to provide the continuously variable speed mechanical transmissions of the friction-drive type type employing a plurality of the chamfered rollers of the geometry of a cylinder with two chamfered ends.

A further object of the present invention is to provide the continuously variable speed mechanical transmissions capable of transmitting a high torque and a high power.

Yet another object of the present invention is to provide the continuously variable speed mechanical transmissions of the friction-drive type providing a long trouble free operation.

Yet a further object of the present invention is to provide the continuously variable speed mechanical transmissions of the friction-drive type with a built-in clutch.

Still another object of the present invention is to provide the continuously variable speed mechanical transmissions of the friction-drive type capable of reversing the direction of the drive without relying on any gear shifting.

Still a further object of the present invention is to provide the continuously variable speed mechanical transmissions of the friction-drive type capable of operating in two opposite directions with continuously variable speed in both directions.

These and the other objects of the present invention will become clear as the description of the present invention proceeds.

BRIEF DESCRIPTION OF FIGURES

The present invention may be described with a great clarity and specificity by referring to the following Figures:

In FIG. 1 there is shown a cross section of chamfered roller mechanical transmission 1 constructed in accordance with the principles of the present invention, which cross section is taken along a plane including the central axis of said mechanical transmission. The chamfered roller mechanical transmission 1 comprises the outer conical rotating member 2 including the first shaft connection means 3 arranged in the coaxial relationship and the inner conical rotating member 4 with the coaxially arranged second shaft connection means 5, wherein said two conical rotating members are rotatably disposed in the coaxial relationship. The conical shell cage 6 disposed intermediate and coaxial to said two conical rotating members 2 and 4 in a clearance relationship includes a plurality of the slotted cut-outs 10, 11, etc. disposed along the direction substantially parallel to and axisymmetric about the central axis of the outer and inner conical rotating members 2 and 4, each of which slotted cut-outs recieves each of a plurality of the chamfered rollers 8, 9, etc. wherein said chamfered rollers are rotatable about their own axis and shiftable following the length of said slotted cut-outs while said chamfered rollers are restrained from orbiting about the central axis of the outer and inner conical members, as the conical shell cage 6 is rigidly affixed to the mounting flange 7. The chamfered rollers 8, 9, etc. have the geometry of a solid cylinder with two chamfered ends and their circumferential surfaces are always under the pressed contact with the inner surface of the outer conical rotating member 2 and the outer surface of the inner conical rotating member 4. The pair of the conical rotating members 2 and 4 are rotatably supported by the conical shell cage-mounting flange assembly by means of the bearings 12 and 13 and, consequently, a constant void space 24 intermediate said two conical rotating members is always preserved. The inner surface of the outer conical rotating member 2 comprises a series of the cylindrical surfaces 14, 15, 16, etc. of progressively varying diameters, which cylindrical surfaces are interconnected by a series of frustum surfaces 17, 18, etc., while the outer surface of the inner control rotating member 4 comprises a series of the cylindrical surfaces 19, 20, 21, etc. with progressively varying diameters, which cylyndrical surfaces are interconnected by a series of the frustum surfaces 22, 23, etc.; whereby, the void space 24 intermediate the outer and inner conical rotating members 2 and 4 is of a series of the cylindrical shell voids of progressively varying mean diameters interconnected by a series of the frustum shell voids. The width of said a series of the cylindrical shell voids are matched to the diameter of the cylindrical mid-section of the chamfered rollers, while the width of said a series of the frustum shell voids are matched to the diagonal distance between two opposite chamfers included in the chamfered rollers. As a consequence, the chamfered rollers are always under a pressed contact with the inner surface of the outer conical rotating member and the outer surface of the inner conical rotating member no matter whether the octagonal conoidal rollers are positioned in the cylindrical shell voids or in the frustum shell voids intermediate the outer and inner conical rotating members. Said surfaces of the outer and inner conical rotating members providing the void space 24 as well as the surface of the chamfered rollers have a high friction coefficient and, consequently, the rotational motions of the outer and inner conical rotating members 2 and 4 are coupled to one another frictionally by the plurality of the chamfered rollers, which are disposed on a common hypothetical plane perpendicular to the central axis of the outer and inner conical rotating members and shiftable in the direction parallel to said central axis. The width of said a series of the cylindrical shell voids and the width of said a series of the frustum shell voids comprising the void space 24 intermediate the outer and inner conical rotating members may be the same or different depending on the specific working environment and the operating condition. The plurality of the chamfered rollers 8, 9, etc. confined in the void space 24 are rotatably supported within a holder slidably engaging the slotted cut-out 11 included in the conical shell cage 6, which arrangement will be described in conjunction with FIGS. 2 and 3. The means for maintaining the plurality of the chamfered rollers on a common hypothetical plane perpendicular to the central axis of the outer and inner conical rotating members as well as for shifting them in unison in the direction parallel to said central axis will be described in conjunction with an illustrative embodiment shown in FIG. 4.

In FIG. 2 there is shown a perspective view illustrating the construction of the mid-section of the conical shell cage 6 including a plurality of the slotted cut-outs 10, 11, etc. disposed in substantially axisymmetric pattern about the central axis of said conical shell cage which central axis substantially coincides with the central axis of the outer and inner conical rotating members. The longitudinal walls 25 and 26 of the slotted cut-out restrains the holder of the chamfered roller from orbiting about the central axis of the outer and inner conical rotating members, while the shifting movement of the holder chamfered roller in the longitudinal direction following the slotted cut-out is unhindered.

In FIG. 3 there is illustrated the chamfered roller 8 rotatably held in the holder 27 slidably confined between two longitudinal walls 25 and 26 of the slotted cut-out 11 included in the conical shell cage 6. The holder 27 of the geometry of a closed rectangular loop includes a pair of coaxially arranged bearings 28 and 29 rotatably supporting the chamfered roller 8. A pair of the wire ropes or cables or chains 30 and 31 extend from two opposite ends of the holder 27 which are anchored to the pair of the dove tail-like sliding joints 32 and 33 slidably connected to the holder 27 adjacent to the pair of bearings 28 and 29, respectively, which dove tail-like sliding joints are slidable in the direction substantially perpendicular to the central axis of the outer and inner conical rotating members. The stop means may be included in said dove tail-like sliding joints in order to limit the the position of the cables 30 and 31 in the range clear of the inner surface of the outer conical rotating members and the outer surface of the inner conical rotating member. With the arrangement for the holder chamfered roller assembly as shown in FIG. 3, said assembly can be shifted in the longitudinal direction of the slotted cut-out following the void space 24 from one end to the other end without hindering the rotational movements of said two conical rotating members as well as the rotational motion of the chamfered roller without allowing the chamfered roller to orbit about the central axis of said two conical rotating members.

In FIG. 4 there is shown a perspective view of an illustrative embodiment of the means for keeping said plurality of the chamfered rollers on a common hypothetical plane perpendicular to the central axis of the outer and inner conical rotating members as well as for shifting said plurality of the chamfered rollers in unison in the direction parallel to said central axis. The cable 30 extending from one extremity of the holder 27 is raced around a capstan 37 attached to one extremity of the conical shell cage 6 and, then, routed back to the other extremity of the conical shell cage 6 where it is raced around a sheave 35 and, then, routed and anchored to the other extremity of the holder 40 supporting the chamfered roller 9. The cable 31 extending from the other extremity of the holder 27 is raced around the sheave 34 attached to said other extremity of the conical shell cage 6 and, then, routed back to said one extremity of the conical shell cage 6 where it is raced around the sheave 36 and, then, routed and anchored to said one extremity of the holder 40. With the arrangement as shown in FIG. 4, the set of the chamfered rollers 8, 9, etc. are kept on a common plane perpendicular to the central axis of the outer and inner conical rotating members wherein said set of the chamfered rollers are shiftable in unison by cranking the capstan 37 by using the handle 39 linked to the capstan 37 by means of the worm gear 38. It should be clearly understood that the illustrative embodiment shown in FIG. 4 is one of the most primitive and simple system for keeping and shifting the set of the chamfered rollers, which embodiment is employed for the sole purpose of simple and clear demonstration of the means for said purpose. The means for cranking the capstan 37 may be operated by an electrical or hydraulic power source. The cables 30 and 31 may be replaced by the roller chains while the the capstan 37 and the plurality of the sheaves 34, 35 and 36 may be replaced by the sprockets. The plurality of the chamfered rollers may be kept on the common plane perpendicular to the central axis of the outer and inner conical rotating members and shifted by the jackscrew or ball-screw means rather than the arrangement shown in FIG. 4. It is clear that there will be many other mechanical or hydraulic means obvious to the skilled in the art which can be employed to maintain the chamfered rollers in the position and shift them from one position to the other positions.

Figure 1:
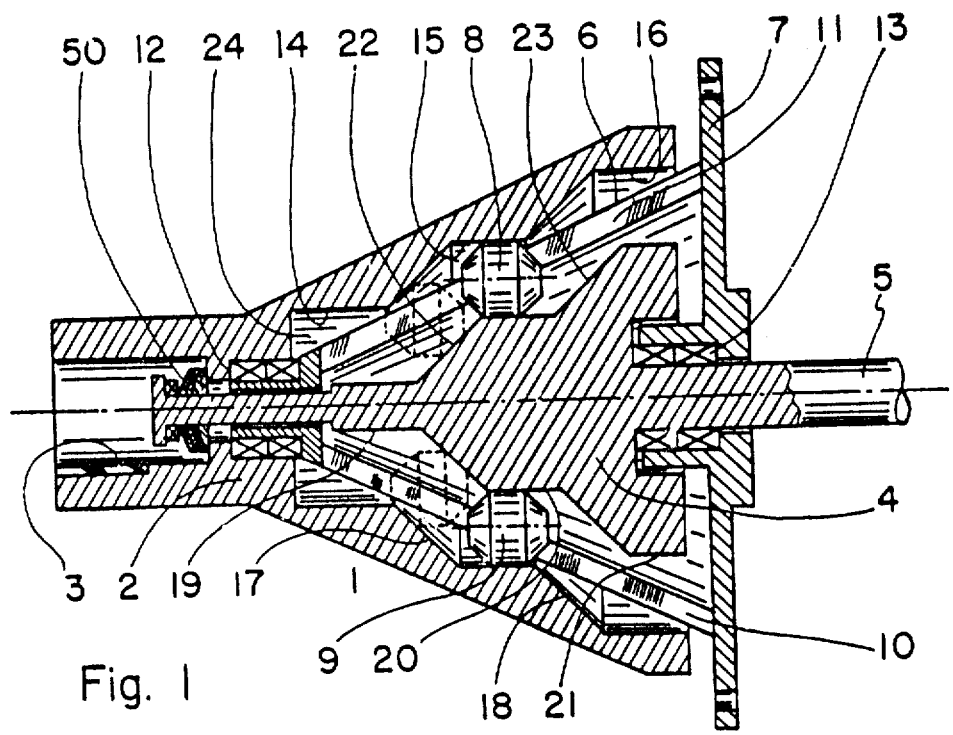
FIG. 1 illustrates a cross section of a chamfered roller meachanical transmission constructed in accordance with the principles of the present inventions.
Figure 2:
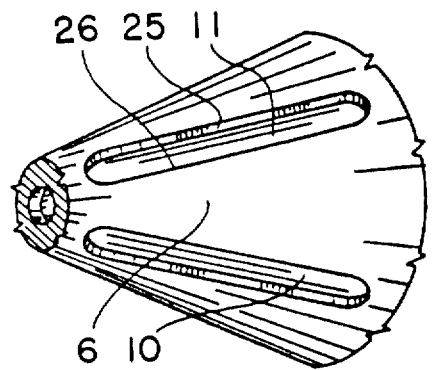
FIG. 2 illustrates a perspective view of the conical shell cage employed in the chamfered mechanical transmission of FIG. 1 for retaining the chamfered rollers within its slotted cut-outs.
Figure 3:
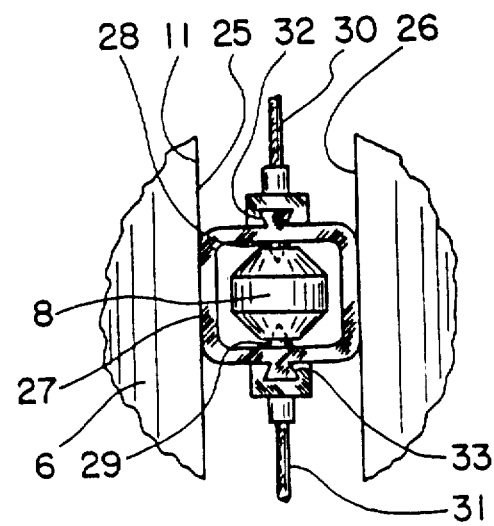
FIG. 3 illustrates the arrangement rotatably holding the chamfered roller in the holder, which holder engages the slotted cut-out included in the conical shell cage in a sliding relationship.
Figure 4:
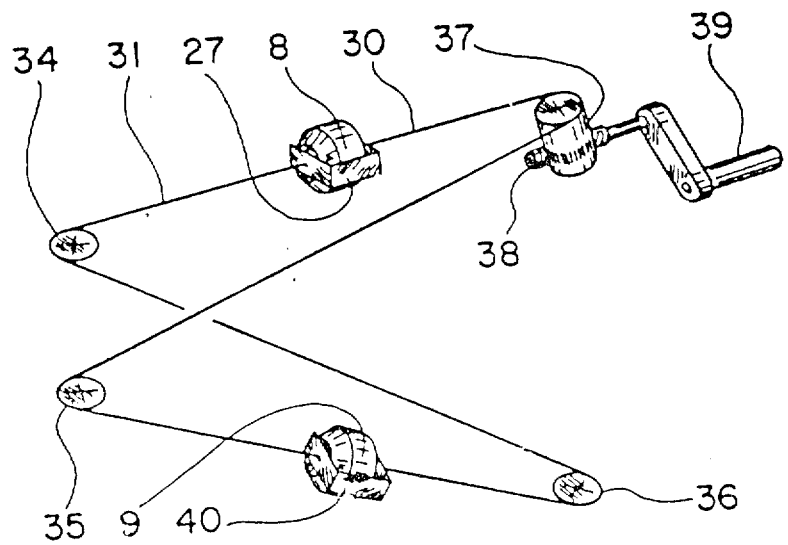
FIG. 4 shows an illustrative embodiment of a means for shifting the set of the chamfered rollers in varying the transmission ratios.

With the arrangement illustrated in FIGS. 1, 2, 3 and 4, the chamfered roller mechanical transmission 1 operates in the following principles: The rotational motion of the outer and inner conical rotating members 2 and 4 are coupled to one another by the plurality of the chamfered rollers 8, 9, etc. confined in the void space 24 intermediate said two conical rotating members in a pressed contact relationship. In other words, the rotation of one conical rotating member results in the rotation of the other conical rotating member and, consequently, one of two shaft connection means 3 and 5 can be used as the power-input shaft and the other as the power-out put shaft. By shifting the set of the chamfered rollers from one cylindrical shell cavity to the other, the mechanical transmission ratio in torque and the speed can be varied. When the plurality of the chamfered rollers are positioned in a cylindrical shell cavity, the cylindrical surfaces of the chamfered rollers are under a pressed line-contact with the inner surface of the outer conical rotating member and the outer surface of the inner conical rotating member wherein all point on the line of said pressed line contact moves at the same linear speed and, consequently, the entire length of the line of the contact is utilized to transmit the mechanical energy, which contrasts many present day friction drive type mechanical transmissions which utilize only the point-contact friction drive such as the case of the ball drive mechanical transmission. For this reason, the chamfered roller mechanical transmission of the present invention is capable of transmitting a much higher torque and power compared with the present day friction-drive type mechanical transmissions. When the plurality of the chamfered rollers are positioned in a frustum shell cavity, the pressed contact between the friction-drive surfaces is equivalent to the point contact, even though it is a line-contact in appearance, because the linear speed at the different points on the line of contact varies due to the sloping surface in the frustum shell that results in the slip between the surfaces under the pressed contact with the exception of one point on the line of the contact that does not experience any slip. However, this does not pose any problem in the chamfered roller mechanical transmissions of the present invention because the frustem shell cavities are used only for the transitional period during the shifting of the transmission ratio from one operational ratio determined by the mean diameter of one cylindrical shell cavity to another operational ratio determined by the mean diameter of adjacent cylindrical shell cavity. This is precisely why the set of the transmission ratios corresponding to the set of the cylindrical shell cavities included in the void space intermediate the outer and inner conical rotating members are called the operational transmission ratios, while the set of transmission ratios corresponding to the set of the frustum shell cavities are called the transitional transmission ratios. Of course, the transmission ratio is varied by shifting the plurality of the chamfered rollers disposed on a common plane perpendicular to the central axis of the outer and inner conical rotating members in the direction parallel to said central axis.

It should be understood that: Firstly, it is advantageous to provide a very small amount of the taper on the cylindrical surface of the outer and inner conical rotating members comprising the cylindrical shell cavities in the void space in such a way that the degree of the pressed contact between the friction-drive surface can be adjusted by controlling the positions of the outer and inner conical rotating members relative to one another in the direction parallel to the central axis of said two conical rotating members or by spring-loading them to exert a constant force pressing said two conical rotating members to one another as exemplified by a plurality of bellevelle spring washers 50 shown in FIG. 1. Secondly, a cylindrical shell cavity of width slightly greater than the diameter of the cylindrical mid-section of the chamfered rollers may be added to both or one of two extremities of the void space intermediate the outer and inner conical rotating members in continuation of the cylindrical shell cavities disposed to either extremity of said void space wherein the chamfered rollers can free-wheel and, thus, the rotational motions of the outer and inner conical rotating members are uncoupled, which arrangement provides the built-in clutch to the chamfered mechanical transmission. The same result of afore-mentioned built-in clutch may be obtained by incorporating a frustum shell cavity of gap dimension greater than the diagonal distance between two diametrically opposite chamfered faces of two chamfered extremities of the chamfered roller. The friction-drive surfaces under the pressed contact may be of the abrasion-resisting hard surface or resilient surface.

Figure 5:
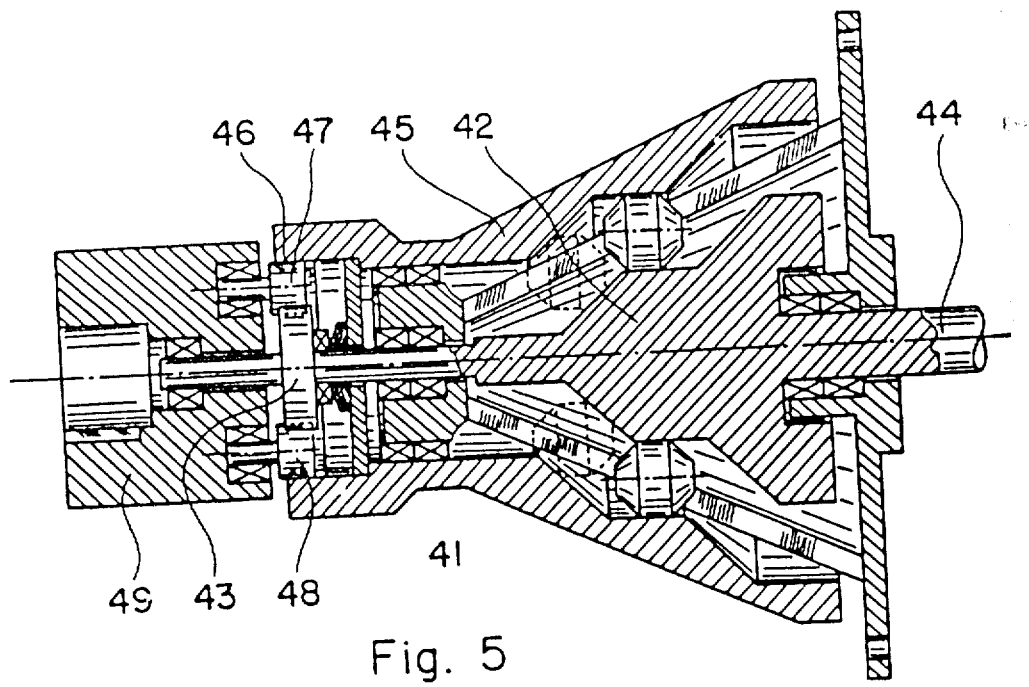
FIG. 5 illustrates a cross section of another chamfered roller mechanical transmission to which a sun-planetary-ring gear assembly is incorporated.

In FIG. 5 there is illustrated a cross section of another chamfered roller mechanical transmission 41 of the construction essentially the same as the chamfered roller mechanical transmission 1 shown in FIG. 1 with the exception that a sun-planetary-ring gear combination is incorporated to the chamfered roller mechanical transmission 41. The inner conical rotating member 42 includes a sun gear 43 coaxially affixed to one extremity opposite to the other extremity including the shaft connection means 44, while the outer conical rotating member 45 includes a ring gear 46 coaxially affixed on a plane including the sun gear 43. A plurality of the planetary gears 47, 48, etc. are rotatably attached to the power-take-off coupling 49 coaxially arranged with respect to the outer and inner conical rotating members 42 and 45 wherein the plurality of the planetary gears are disposed axisymmetrically about the central axis of the power-take-off coupling 49 and simultaneously engage the sun gear 43 and the ring gear 46. With the arrangement shown in FIG. 5, the chamfered roller mechanical transmission 41 is capable of reversing the direction of the rotation of the power-take-off coupling 49 as well as varyng the transmission ratio in the forward and reverse operations, which eliminates the necessity of the shifting gear system in reversing the direction of the operation. The chamfered roller mechanical transmission 41 shown in FIGS. 1 and 5 may be used in combination with various other mechanical or hydraulic transmissions available today.

While the principles of the present invention have now been made clear by the illustrative embodiments, there will be immediately obvious to the skilled in the art many modifications of the arrangement, structure, proportion, elements and material which are particularly adaptable to the specific working environment and the operating condition without departing from those principles of the present invention.

I claim:

1. A chamfered roller mechanical transmission comprising in combination:
    (a) an outer conical rotating member with an inner surface including a plurality of circular cylindrical surfaces of progressively varying diameters and a plurality of circular frustum surfaces disposed coaxially in an alternating fashion wherein each adjacent pair of said plurality of circular cylindrical surfaces are interconnected by each of said circular frustum surfaces in a continuous configuration;
    (b) an inner conical rotating member with an outer surface including a plurality of circular cylindrical surfaces of progressively varying diameters and a plurality of circular frustum surfaces disposed coaxially in an alternating fashion wherein each adjacent pair of said plurality of circular cylindrical surfaces are interconnected by each of said circular frustum surfaces in a continuous configuration, said inner conical rotating member rotatably disposed inside of said outer conical rotating member in a coaxial relationship providing a series of circular cylindrical shell voids of a constant gap dimension and of progressively varying mean diameters and a series of circular frustum shell voids of another constant gap dimension interconnecting each adjacent pair of said series of circular cylindrical shell voids;
    (c) a plurality of chamfered rollers rotatably disposed in said shell void intermediate said outer and inner conical rotating members on a common hypothetical plane perpendicular to the central axis of said outer and inner conical rotating members in a substantially axisymmetric pattern with respect to the central axis of said outer and inner conical rotating members, said plurality of chamfered rollers with the central axis disposed parallel to the central axis of said outer and inner conical rotating members including a circular cylindrical mid-section having a constant diameter matched to said a constant gap distance of said circular cylindrical shell voids and further including two chamfered extremities on opposite sides of the cylindrical mid-section wherein the diagonal distance between two diametrically opposite chamfered faces of said two chamfered extremities is matched to said another constant gap distance of said circular frustum shell voids; whereby, a rotating motion of one of said outer and inner conical rotating members is transmitted to another rotating motion of the other of said outer and inner conical rotating members by means of pressurized frictional contact provided by either said circular cylindrical mid-section of said plurality of chamfered rollers in line-contact with said circular cylindrical surfaces of said outer and inner conical rotating members or said two chamfered extremities of said chamfered rollers respectively in contact with said circular frustum surfaces of said outer and inner conical rotating members;
    (d) means for preventing said plurality of chamfered rollers from orbiting about the central axis of said outer and inner conical rotating members;
    (e) means for maintaining said plurality of chamfered rollers on said common hypothetical plane perpendicular to the central axis of said outer and inner conical rotating members in said substantially axisymmetric pattern and for shifting said plurality of chamfered rollers in unison in a direction parallel to the central axis of said outer and inner conical rotating members; and
    (f) means for connecting a power-input shaft to one of said outer and inner conical rotating members and a power-output shaft to another of said outer and inner conical rotating members.

2. The combination as set forth in claim 1 wherein an additional circular cylindrical shell void with a gap dimension slightly greater than the diameter of said circular cylindrical mid-section of said plurality of chamfered rollers is disposed coaxially and adjacent to one extremity of said shell void intermediate said outer and inner conical rotating members in continuation of said shell void; whereby, the frictional coupling between said outer and inner conical rotating members becomes disengaged when said plurality of chamfered rollers are shifted into said additional circular cylindrical shell void.

3. The combination as set forth in claim 1 wherein said plurality of circular cylindrical surfaces included in said outer and inner conical rotating members includes common slope of a minute amount; whereby, said constant gap dimension of said circular cylindrical shell voids is adjusted by moving said outer and inner conical rotating members relative to one another in a direction parallel to the central axis of said outer and inner conical rotating members.

4. The combination as set forth in claim 3 that include means for spring loading one of said outer and inner conical rotating members toward to another; whereby, the pressurized contact providing the friction drive between the surfaces of said plurality of chamfered rollers and said inner surface of said outer conical rotating member and said outer surface of said inner conical rotating member is enhanced.

5. The combination as set forth in claim 1 wherein an additional circular frustum shell void with a gap dimension slightly greater than the diagonal distance between two diametrically opposite sides of the chamfered faces of said two chamfered extremities of each of said plurality of chamfered rollers is disposed coaxially and adjacent to one extremity of said void shell intermediate said outer and inner conical rotating members in continuation of said shell void; whereby, the frictional coupling between said outer and inner conical rotating members becomes disengaged when said plurality of chamfered rollers are shifted into said additional circular frustum shell void.

6. The combination as set forth in claim 2 wherein said plurality of circular cylindrical surfaces included in said outer and inner conical rotating members includes common slope of a minute amount; whereby, said constant gap dimension of said circular cylindrical shell voids is adjusted by moving said outer and inner conical rotating members relative to one another in a direction parallel to the central axis of said outer and inner conical rotating members.

7. The combination as set forth in claim 6 that include means for spring loading one of said outer and inner conical rotating members toward to another; whereby, the pressurized contact providing the friction drive between the surfaces of said plurality of chamfered rollers and said inner surface of said outer conical rotating member and said outer surface of said inner conical rotating member is enhanced.

8. The combination as set forth in claim 5 wherein said plurality of circular cylindrical surfaces included in said outer and inner conical rotating members includes common slope of a minute amount; whereby, said constant gap dimension of said circular cylindrical shell voids is adjusted by moving said outer and inner conical rotating members relative to one another in a direction parallel to the central axis of said outer and inner conical rotating members.

9. The combination as set forth in claim 8 that includes means for spring leading one of said outer and inner conical rotating members toward to another; whereby, the pressurized contact providing the friction drive between the surfaces of said plurality of chamfered rollers and said inner surface of said outer conical rotating member and said outer surface of said inner conical rotating member is enhanced.

* * * * *